April 13, 1965 J. BLUMENTHAL 3,178,519

MAGNETIC TRANSDUCER HEAD

Filed Dec. 27, 1960 2 Sheets-Sheet 1

*INVENTOR.*
JOHN BLUMENTHAL

*BY*

Elser J. Hyde

ATTORNEY

April 13, 1965 J. BLUMENTHAL 3,178,519

MAGNETIC TRANSDUCER HEAD

Filed Dec. 27, 1960 2 Sheets-Sheet 2

INVENTOR.
JOHN BLUMENTHAL

BY Elder J. Hyde

ATTORNEY 3,178,519
MAGNETIC TRANSDUCER HEAD
John Blumenthal, Cleveland, Ohio, assignor to Clevite Corporation, a corporation of Ohio
Filed Dec. 27, 1960, Ser. No. 78,464
10 Claims. (Cl. 179—100.2)

This invention pertains to a magnetic transducer head, and more particularly to a magnetic transducer head for use in data handling equipment wherein heads are from time to time replaced, and wherein it is of extreme importance that the position and orientation of the transducer gap or gaps of the original and of the replacement heads be identical.

Magnetic recording and reproducing has become very important in the general field of data handling and computing. It has grown into this field from its original use in the field of music, speech, etc. Because the data handling equipment operates at a much higher rate of speed and because higher frequencies are handled the transducer heads must generally be of a much higher quality than heads used for speech or music. Another stringent requirement which is present in data handling equipment and which is not critical in equipment for speech or music is the requirement that none of the data signals be lost, and that the time relationship of one data channel be maintained even in respect to another data channel be maintained even though one or more replacement heads be substituted into the data handling machine. With the advent of improved magnetic tape the "packing factor" has greatly increased, and with the increased packing factor it has become essential that the transducing gap in the heads, whether single channel or multiple channel, be as short as possible, and it is essential that the head be mountable in the data equipment so that the gap or gaps in each replacement head is exactly in the same position as the gap or gaps of the previous head. Otherwise a great amount of data which was recorded on tape by the previous head will be reproduced by a head (or by heads) whose gap position or orientation is slightly different from the previous head. This will cause errors or missed data in the reproduction of the data signals.

It is essential that the operator of data processing equipment be able to replace a worn head with a new head and be sure that the gap of the new head is in exactly the same place as the gap of the previous head, and to be sure that the orientation of the gap is identical to the orientation of the gap of the replaced head, and to effect the replacement without a great deal of time being lost in orientating and aligning the replacement head.

It is, therefore, an object of the invention to provide a magnetic transducer head, particularly for data handling equipment, wherein the transducing gap or gaps have a known, fixed, carefully controlled relationship to other mounting portions of the head, whereby replacement of a worn head by another assures that the transducer gaps of the second head are in exactly the same position and have the same orientation as the gaps of the replaced head.

Another object of the invention is to provide a new and novel magnetic transducer head which is relatively inexpensive to manufacture, and wherein any one of the heads is as nearly exactly a duplicate of the other heads as is possible, this relationship being made possible by the head construction which has few parts and is therefore not likely to vary considerably due to manufacturing tolerances.

Another object of the invention is to provide a magnetic transducer head having a transducing gap bearing a fixed relation to a structural member such as the head housing, whereby heads are interchangeable and will maintain a fixed, highly accurate relationship.

For a better understanding of the present invention, together with other and further objects thereof, reference is had to the following description taken in connection with the accompanying drawings, and its scope will be pointed out in the appended claims.

With reference to the drawings there is shown in FIGURE 1 an isometric view of one form of a magnetic transducer head of the present invention.

An aspect of the present invention lies in the provision of a magnetic transducer head to be mounted in carefully controlled orientation to a structural member such as another head or such as a transducing device, computer, data handling machine or the like. A mounting member is provided and it has at least one planar core mounting area and another planar area having predetermined and carefully controlled orientation in respect to the core mounting area. The magnetic core circuit is formed of a first core portion having a transducing gap face and a coplanar mounting face and a second core portion having a transducing gap face. Holding means hold the first core portion with its mounting face against the planar core mounting area of the mounting member and with its transducing gap face free of engagement with the mounting member. Holding means hold the second core portion with its transducing gap face against the free transducing gap face of the first core portion forming a substantially closed magnetic circuit therewith, and coil means are wrapped about the magnetic circuit. The other planar area of the mounting member is exposed for mounting the transducer head in the predetermined, carefully controlled orientation in regard to a structural member such as another head channel or the other elements of a magnetic transducing machine.

Figure 1:
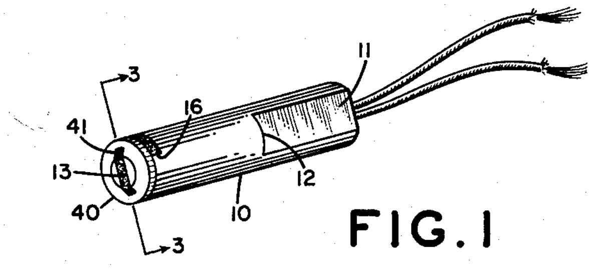

FIGURE 1 shows a magnetic transducer head of the present invention, having a structural member such as a tubular housing 10 made of metal or the like, the housing having a flat portion 11 which may index into a keyed portion of data translating equipment in order to accurately fix the rotational position of the head in respect to the equipment, and having a shoulder portion 12 which may fix the height of the head in the translating equipment.

The plane of the flat face 11 bears a known fixed relationship to the plane of one of the transducing gap faces which helps to define the transducing gap of the head, for example, as shown it is perpendicular to one edge of the gap 13.

The flat 11 and the shoulder 12 should be accurately formed as they are important to the correct positioning of the head in the translating equipment. It is also essential that the head be assembled accurately so that the gap 13 bears a fixed, carefully controlled relationship to the flat 11 and to the shoulder 12. In order to achieve this high order of accurate alignment the flat 11 is machined into the housing during the same operation which forms faces 15, 16.

Figure 2:
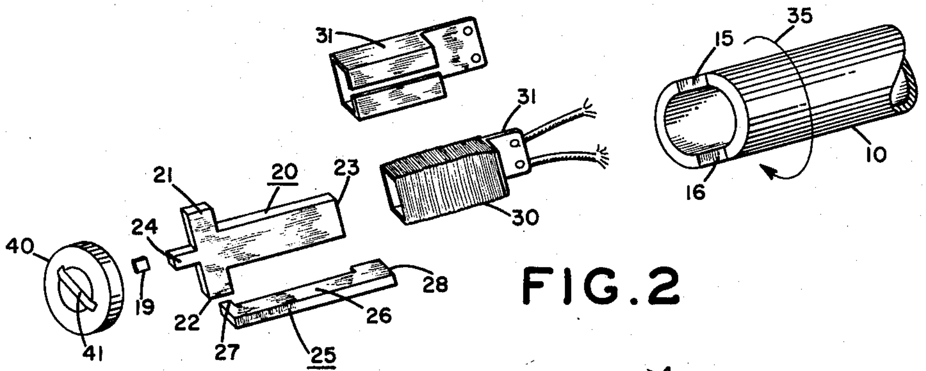
FIGURE 2 is an isometric, exploded view showing the parts of the transducer head, but with the two core portions rotated 180 degrees in respect to the housing, for purposes of clarity.
Figure 3:
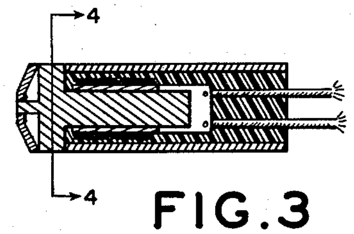
FIGURE 3 is a longitudinal sectional view taken along line 3—3 of FIGURE 1.
Figure 4:
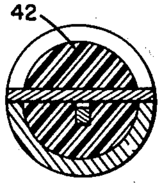
FIGURE 4 is a transverse sectional view taken along line 4—4 of FIGURE 3.

FIGURE 2 shows the internal structure of the head. The housing 10 is tubular and preferably is round. One end is cut away to form faces 15, 16 which lie exactly on the diameter of the round tube 10. These faces 15, 16 are carefully lapped to assure that they are co-planar and are exactly on the diameter of the tube, thus forming the third control surface necessary to the formation of a highly accurate head. It is important that all three of these carefully machined and controlled faces 11, 12, 15 and 16, are on the single piece housing 10, thereby facilitating accurate control of all of the manufacturing tolerances of the head, and insofar as possible all of the machining steps should be taken while the tube is mounted in the holder of the machine tool to eliminate having to accurately re-index the tube for subsequent operations.

The magnetic core member is formed of a first core portion 20 which is in the form of a T or + having outstanding arms 21, 22, a longitudinally extending body portion 23, and a tip 24, and a second core portion 25 which preferably is in the form of a flat U-shape having a central body portion 26 and end contact portions 27, 28. One major face of the first core portion 20 should be lapped flat, and the tips 27, 28 of the second core portion 25 should be lapped flat.

A coil 30 is wound on a coil form 31 and is slipped over the body portion 23 of the first core portion 20, the space between the contact portions 27, 28 of the second core portion 25 providing space and clearance for the coil and coil form. The tip 27 of the second core portion 25 engages the lapped face of the tip portion 24 of the first core portion, and the tip 28 engages the body 23, thereby forming a magnetic circuit having a gap at the location where tip 27 engages tip 24. As in any magnetic transducer head, gap forming material such as a shim 19 may be placed between the tips 24, 27 to better define the gap 13 and to control its length.

Thereafter the core 20, 25 is placed in the tubular housing 10 with the body portion 23 extending down in the tube, and with the lapped faces of the tips 21, 22 in engagement with the lapped faces 15, 16 of the tube 10. The arrow 35 indicates that the core assembly 20, 25 is rotated about 90 degrees from the relationship shown in FIGURE 2 before it is inserted into tube 10. Consequently the transducing gap 13 between tips 24 and 27 must lie accurately on the diameter of the tube 10 as defined by the lapped plane through faces 15, 16, and thus is accurately defined in relation to the mounting flat 11 of the housing.

A cap 40 having a slot 41 is then secured to the housing 10 with the core tips 24, 27 extending through the slot 41 at least to the outside surface of the cap 40. The exposed edges of the core tips may then be lapped smooth to reduce wear on the tape as it passes in contact therewith. The entire housing 10 is then filled with a hardenable plastic material 42 to secure the parts together and to assure maximum protection against moisture or dislocation of parts due to rough treatment.

Figure 6:
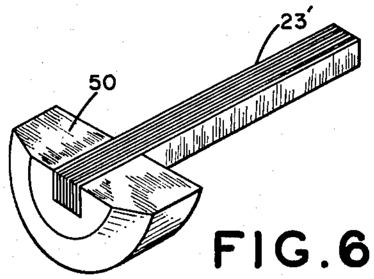
FIGURE 6 shows still another modified laminated core.
Figure 5:
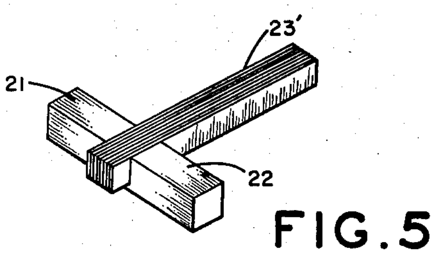
FIGURE 5 is an isometric view showing a modified core structure of the laminated type.

While the first portion of the core 20 is shown as a single +-shaped layer, it may also be T-shaped as shown in FIGURE 6, and the body portion 23' may also be made of laminated material, as shown in FIGURE 5. Further, as shown in FIGURE 6, the transverse core portion 50 which is lapped to engage mounting faces 15, 16 may be molded of any of the well known magnetic head materials.

In Patent 2,888,522, owned by the same assignee as the assignee of the present invention, broad reference mounting surfaces were lapped co-planar with the plane of the transducer gaps and these surfaces were used for accurately mounting the head in a machine. In the present invention a portion of the core itself defines the lapped mounting surfaces and a co-planar portion of the core defines one of the transducing gap faces.

The principle involved in the head shown in FIGURES 1 to 6 may be carried into multichannel heads as shown in FIGURES 7 to 10.

Figure 8:
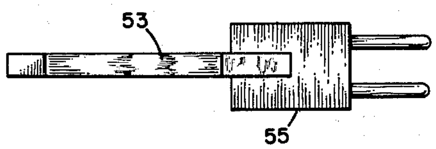
FIGURE 8 is a top view of the head.
Figure 7:
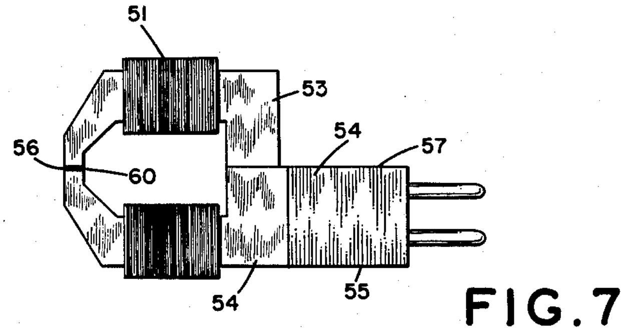
FIGURE 7 is a side view of a modified head incorporating the principle of the present invention.
Figures 9, 10:
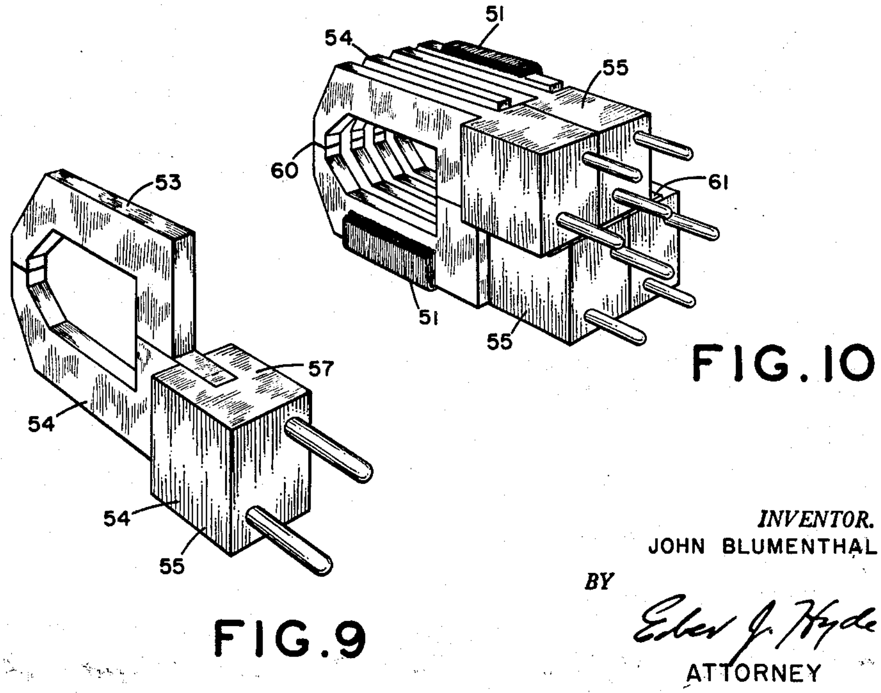
FIGURE 9 is an isometric view of the head.
FIGURE 10 is an isometric view showing how a plurality of the heads shown in FIGURES 7, 8 and 9 are assembled in nested relationship utilizing the principle of the invention to assure absolute gap alignment.

FIGURES 7, 8 and 9 show, respectively, a side view, an edge view, and an isometric view of one channel of a multichannel head (FIGURE 7 showing the coil 51 wound around it). The head is formed of two core portions 53, 54, the portion 54 having an enlarged rear portion 55 forming a structural member. The surface 57 of the structural member is lapped flat and co-planar with the gap face 56. When a plurality of these channel sections are assembled as shown in FIGURE 10, with every second channel rotated 180° in respect to its two adjacent channel sections a nesting effect is achieved and the lapped surfaces 57 engage each other, thereby positively and accurately aligning all of the transducer gaps 56 in a common plane. If a shim 60 is positioned in the transducing gap then a shim 61 of equal thickness must be positioned between the enlarged rear portions 55.

While there have been described what are at present considered to be the preferred embodiments of this invention, it will be obvious to those skilled in the art that various changes and modifications may be made therein without departing from the invention, and it is therefore, aimed in the appended claims to cover all such changes and modifications as fall within the true spirit and scope of the invention.

I claim:

1. A magnetic transducer head to be mounted in carefully controlled orientation to a structural member such as another head or such as a transducer device comprising, in combination: a mounting member having first planar core mounting area means and having a second planar area having predetermined and carefully controlled orientation in respect to said first core mounting area means; magnetic core means formed of a first core portion having a transducing gap face and a mounting face coplanar with said transducing gap face, and a second core portion having a transducing gap face; holding means holding said first core portion with its mounting face against the said first planar core mounting area means of said mounting member and with its transducing gap face free of engagement with said mounting member; holding means holding said second core portion with its transducing gap face against the free transducing gap face of said first core portion forming a substantially closed magnetic circuit therewith; and coil means about said magnetic circuit; the said second planar area of said mounting member being exposed for mounting said transducer head in predetermined carefully controlled orientation in regard to a structural member.

2. A magnetic transducer head as set forth in claim 1, further characterized by: said first planar core mounting area means and said second planar area being co-planar.

3. A magnetic transducer head ts set forth in claim 1, further characterized by: said first planar core mounting area means comprising two spaced apart areas and by said mounting member having a groove between said two spaced apart areas; and by said first core portion having two spaced apart, co-planar core mounting faces; the said two core mounting faces engaging the two spaced apart mounting areas of said mounting member.

4. A magnetic transducer head comprising in combination: a hollow tubular member having a wall portion defining two wall faces spaced apart one on each side of said tubular member, said faces lying in a common plane; magnetic core means formed of a first substantially T-shaped core portion mounted within said tubular member and having its arms held in engagement with said two faces and a second core portion mounted within said tubular member and held in engagement with said first core portion and defining therewith a magnetic circuit including a transducing gap defined by two transducing gap faces of said two core portions, one of said transducing gap faces lying in the plane of said two wall faces whereby the location of said transducing gap in relation to said tubular member is accurately fixed; and coil means around said magnetic core means.

5. A magnetic transducer head comprising in combination: a hollow tubular member having a wall portion defining two wall faces spaced apart one on each side of said tubular member, said faces lying in a common plane; magnetic core means formed of a first cross-shaped core portion mounted within said tubular member and having arms held in engagement with said two faces and a second core portion mounted within said tubular member and held in engagement with said first core portion and defining therewith a magnetic circuit including a transducing gap defined by two transducing gap faces of said two core portions, one of said transducing gap faces lying in the plane of said two wall faces whereby the location of said transducing gap in relation to said tubular member is accurately fixed; and coil means around said magnetic core means.

6. A magnetic transducer head comprising in combination: a round hollow tubular member having wall portions defining two wall faces spaced apart one on each side of said tubular member, said faces lying in a common plane on the diameter of said tubular member; magnetic core means formed of a first cross-shaped core portion mounted within said tubular member and having arms held in engagement with said two faces and a second core portion mounted within said tubular member and held in engagement with said first core portion and defining therewith a magnetic circuit including a transducing gap defined by two transducing gap faces of said two core portions, one of said transducing gap faces lying in the plane of said two faces; and coil means around said magnetic core means.

7. A magnetic transducer head comprising in combination: a round hollow tubular housing member having wall portions defining two wall faces spaced apart one on each side of said tubular member, said faces lying in a common plane on the diameter of said tubular member; magnetic core means formed of a first cross-shaped core portion mounted within said tubular member and having two arms each held in engagement with one of said two faces and having a body extending into said tubular housing, and a second core portion mounted within said tubular member and held in engagement with said first core portion and defining therewith a magnetic circuit including a transducing gap defined by two transducing gap faces of said two core portions, one of said transducing gap faces lying in the plane of said two wall faces whereby the location of said transducing gap in relation to said tubular member is accurately fixed; and coil means around said magnetic core means.

8. A magnetic transducer head as set forth in claim 7, further characterized by said round tubular housing member having a flat portion, the plane of said flat portion being parallel to the plane defined by said two faces.

9. A magnetic transducer head as set forth in claim 7, further characterized by an end cap having a slot therethrough secured to and closing the said tubular housing member at the end defining the said two faces, said magnetic core means at the location of said gap extending into said slot whereby it is exposed for a transducing operation.

10. A magnetic transducer head as set forth in claim 9, further characterized by said first core portion comprising a flat member and by said second core portion comprising a flat substantially U-shaped member whose plane is perpendicular to the plane of said first core portion.

References Cited by the Examiner

UNITED STATES PATENTS

| | | | |
|---|---|---|---|
| 2,965,886 | 12/60 | Mitchell | 346—74 |
| 2,928,907 | 3/60 | Lubkin | 179—100.2 |

IRVING L. SRAGOW, *Primary Examiner.*

NEWTON N. LOVEWELL, WALTER W. BURNS, Jr., *Examiners.*